United States Patent
Graziosi et al.

(10) Patent No.: US 12,412,313 B2
(45) Date of Patent: Sep. 9, 2025

(54) MESH GEOMETRY CODING

(71) Applicants: SONY GROUP CORPORATION, Tokyo (JP); Sony Corporation of America, New York, NY (US)

(72) Inventors: Danillo Graziosi, Flagstaff, AZ (US); Alexandre Zaghetto, San Jose, CA (US); Ali Tabatabai, Cupertino, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 364 days.

(21) Appl. No.: 17/987,828

(22) Filed: Nov. 15, 2022

(65) Prior Publication Data

US 2023/0306641 A1 Sep. 28, 2023

Related U.S. Application Data

(60) Provisional application No. 63/269,915, filed on Mar. 25, 2022.

(51) Int. Cl.
*G06T 9/00* (2006.01)
*G06T 3/4007* (2024.01)

(52) U.S. Cl.
CPC ............ *G06T 9/001* (2013.01); *G06T 3/4007* (2013.01)

(58) Field of Classification Search
None
See application file for complete search history.

(56) References Cited

U.S. PATENT DOCUMENTS

2019/0373241 A1 12/2019 Boyce
2020/0204808 A1* 6/2020 Graziosi ............... H04N 19/90

OTHER PUBLICATIONS

Schwalb et al. (Fast Motion Estimation on Graphics Hardware for H.264 Video Encoding IEEE Transactions on Multimedia (vol. 11, Issue: 1, 2009, pp. 1-10) (Year: 2009).*
Nakagawa et al. Estimating Surface Normals with Depth Image Gradients for Fast and Accurate Registration, 2015 International Conference on 3D Vision (2015, pp. 640-647) (Year: 2015).*

(Continued)

*Primary Examiner* — Kee M Tung
*Assistant Examiner* — Biao Chen
(74) *Attorney, Agent, or Firm* — Haverstock & Owens, A Law Corporation (57) ABSTRACT

Depth image generation is improved by more efficient encoding using video codecs. The mapping of the depth to the luma channel is performed by not using all bits available, and with the remaining bits, a depth scaling factor is generated and incorporated into the bilinear interpolation algorithm used during rasterization. A normal filtering procedure is described, where the positions of vertices are adjusted according to the normal estimated from the surface pixels. After decoding the depth image, the pixels related to the surface of a triangle are collected and used to estimate a plane and the normal of the plane. The normal is compared to the normal obtained from the plane defined by the three vertices of the triangle. If there is no match, the positions of the vertices are adjusted to match the estimated normal from the pixels' surfaces. The adjustment can follow an iterative minimization process.

15 Claims, 4 Drawing Sheets

(56) References Cited

OTHER PUBLICATIONS

Danillo B. Graziosi, et al, "[V-CG] Sony's Dynamic Mesh Coding Call for Proposal Response", ISO/IEC JTC 1/SC 29/WG 7 m59284, 24 Online—Apr. 2022 (Apr. 24, 2022), International Organisation for Standardisation Organisation Internationale De Normalisation ISO/IEC JTC 1/SC 29/WG 7, Coding of Moving Pictures and Audio, pp. 1-30, XP030301436.

Danillo Graziosi, et al, "[V-PCC] [specification] Depth range adjustment", ISO/IEC JTC 1/SC 29/WG 11 m51170, Geneva, CH—Oct. 2019; Geneva, International Organisation for Standardisation Organisation Internationale De Normalisation, ISO/IEC JTC 1/SC 29/WG 11, Coding of Moving Pictures and Audio, (Oct. 5, 2019), pp. 1-8, XP030221630.

Sung-Gyun Lim, et al, "[MIV) CE3. 2: Piecewise linear scaling of geometry atlas", ISO/IEC JTC 1/SC 29/WG 4 m57419, Jul. 2021, Online, International Organisation for Standardisation Organisation Internationale De Normalisation ISO/IEC JTC 1/SC 29/WG 4, MPEG Video Coding,(Jul. 6, 2021), pp. 1-8, XP030297054.

Mingqiang Wei, et al, "Bi-Normal Filtering for Mesh Denoising", IEEE Transactions on Visualization and Computer Graphics, vol. 21, No. 1, Jan. 1, 2015 (Jan. 1, 2015), pp. 43-55, XP011565178.

\* cited by examiner

```
┌─────────────────────────────────────────────────┐
│ Mapping depth information to a luma channel     │
│ using fewer than all available bits.            │─── 400
└─────────────────────────────────────────────────┘
                        │
                        ▼
┌─────────────────────────────────────────────────┐
│ Generating a depth scaling factor which is      │
│ incorporated into a bilinear interpolation      │─── 402
│ algorithm used during rasterization.            │
└─────────────────────────────────────────────────┘
                        │
                        ▼
┌─────────────────────────────────────────────────┐
│ Performing normal filtering.                    │─── 404
└─────────────────────────────────────────────────┘
```

MESH GEOMETRY CODING

CROSS-REFERENCE TO RELATED APPLICATION(S)

This application claims priority under 35 U.S.C. § 119(e) of the U.S. Provisional Patent Application Ser. No. 63/269,915, filed Mar. 25, 2022 and titled, "MESH GEOMETRY CODING," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

Recently, a novel method to compress volumetric content, such as point clouds, based on projection from 3D to 2D is being standardized. The method, also known as V3C (visual volumetric video-based compression), maps the 3D volumetric data into several 2D patches, and then further arranges the patches into an atlas image, which is subsequently encoded with a video encoder. The atlas images correspond to the geometry of the points, the respective texture, and an occupancy map that indicates which of the positions are to be considered for the point cloud reconstruction.

In 2017, MPEG had issued a call for proposal (CfP) for compression of point clouds. After evaluation of several proposals, currently MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. This method has proven to be more efficient than native 3D coding, and is able to achieve competitive bitrates at acceptable quality.

Due to the success for coding 3D point clouds of the projection-based method (also known as the video-based method, or V-PCC), the standard is expected to include in future versions further 3D data, such as 3D meshes. However, current version of the standard is only suitable for the transmission of an unconnected set of points, so there is nomechanism to send the connectivity of points, as it is required in 3D mesh compression.

Methods have been proposed to extend the functionality of V-PCC to meshes as well. One possible way is to encode the vertices using V-PCC, and then the connectivity using a mesh compression approach, like TFAN or Edgebreaker. The limitation of this method is that the original mesh has to be dense, so that the point cloud generated from the vertices is not sparse and can be efficiently encoded after projection. Moreover, the order of the vertices affect the coding of connectivity, and different method to reorganize the mesh connectivity have been proposed. An alternative way to encode a sparse mesh is to use the RAW patch data to encode the vertices position in 3D. Since RAW patches encode (x,y,z) directly, in this method all the vertices are encoded as RAW data, while the connectivity is encoded by a similar mesh compression method, as mentioned before. Notice that in the RAW patch, the vertices may be sent in any preferred order, so the order generated from connectivity encoding can be used. The method can encode sparse point clouds, however, RAW patches are not efficient to encode 3D data, and further data such as the attributes of the triangle faces may be missing from this approach.

SUMMARY OF THE INVENTION

Depth image generation is improved by more efficient encoding using video codecs. The mapping of the depth to the luma channel is performed by not using all bits available, and with the remaining bits, a depth scaling factor is generated and incorporated into the bilinear interpolation algorithm used during rasterization. A normal filtering procedure is described, where the positions of vertices are adjusted according to the normal estimated from the surface pixels. After decoding the depth image, the pixels related to the surface of a triangle are collected and used to estimate a plane and the normal of the plane. The normal is compared to the normal obtained from the plane defined by the three vertices of the triangle. If there is no match, the positions of the vertices are adjusted to match the estimated normal from the surface pixels. The adjustment can follow an iterative minimization process.

In one aspect, a method of mesh geometry coding comprises mapping depth information to a luma channel using fewer than all available bits, generating a depth scaling factor which is incorporated into a bilinear interpolation algorithm used during rasterization and performing normal filtering including adjusting positions of vertices according to an estimated normal from surface pixels. Mapping the depth information to the luma channel includes using M bits of N available bits, where M is less than N. Generating the depth scaling factor utilizes 2 remaining bits of the N available bits. The 2 remaining bits enable multiplication of data by 4 such that the last two bits of the data are 0, and enabling use of most significant bit alignment. The method comprises applying the depth scaling factor to data, wherein the data comprises floating point values. Normal filtering includes performing plane fitting using points within a triangle. Normal filtering includes using one-ring, two-ring or three-ring face neighborhoods for minimization of total normal angles.

In another aspect, an apparatus comprises a non-transitory memory for storing an application, the application for: mapping depth information to a luma channel using fewer than all available bits, generating a depth scaling factor which is incorporated into a bilinear interpolation algorithm used during rasterization and performing normal filtering including adjusting positions of vertices according to an estimated normal from surface pixels and a processor coupled to the memory, the processor configured for processing the application. Mapping the depth information to the luma channel includes using M bits of N available bits, where M is less than N. Generating the depth scaling factor utilizes 2 remaining bits of the N available bits. The 2 remaining bits enable multiplication of data by 4 such that the last two bits of the data are 0, and enabling use of most significant bit alignment. The application is configured for applying the depth scaling factor to data, wherein the data comprises floating point values. Normal filtering includes performing plane fitting using points within a triangle. Normal filtering includes using one-ring, two-ring or three-ring face neighborhoods for minimization of total normal angles.

In another aspect, a system comprising: one or more cameras for acquiring three dimensional content, an encoder for encoding the three dimensional content: mapping depth information to a luma channel using fewer than all available bits, generating a depth scaling factor which is incorporated into a bilinear interpolation algorithm used during rasterization and performing normal filtering including adjusting positions of vertices according to an estimated normal from surface pixels. Mapping the depth information to the luma channel includes using M bits of N available bits, where M is less than N. Generating the depth scaling factor utilizes 2 remaining bits of the N available bits. The 2 remaining bits enable multiplication of data by 4 such that the last two bits of the data are 0, and enabling use of most significant bit alignment. The encoder is configured for applying the depth scaling factor to data, wherein the data comprises floating point values. Normal filtering includes performing plane fitting using points within a triangle. Normal filtering includes using one-ring, two-ring or three-ring face neighborhoods for minimization of total normal angles.

DETAILED DESCRIPTION OF THE PREFERRED EMBODIMENT

Depth image generation is able to be improved by more efficient encoding using video codecs. The mapping of the depth to the luma channel is performed by not using all the bits available (e.g., using only 6 bits instead of 8 bits), and with the remaining bits, a depth scaling factor is generated that is incorporated into the bilinear interpolation algorithm used during rasterization. In this way, when rasterizing the surface of a triangle, due to the depth scaling factor, higher precision values are able to be used. A normal filtering procedure is also described, where the positions of vertices are adjusted according to the normal estimated from the surface pixels. After decoding the depth image, the pixels that are related to the surface of a triangle are collected and used to estimate a plane and consequently the normal of the plane. The normal is then compared to the normal obtained from the plane defined by the three vertices of the triangle. In case there is no match to a certain threshold, the positions of the vertices are adjusted to match the estimated normal from the surface pixels. The adjustment can also follow an iterative minimization process that finds the total minimum deviations of normal angle within the one-ring, two-ring or three-ring face neighborhood of a given face.

Figure 1:
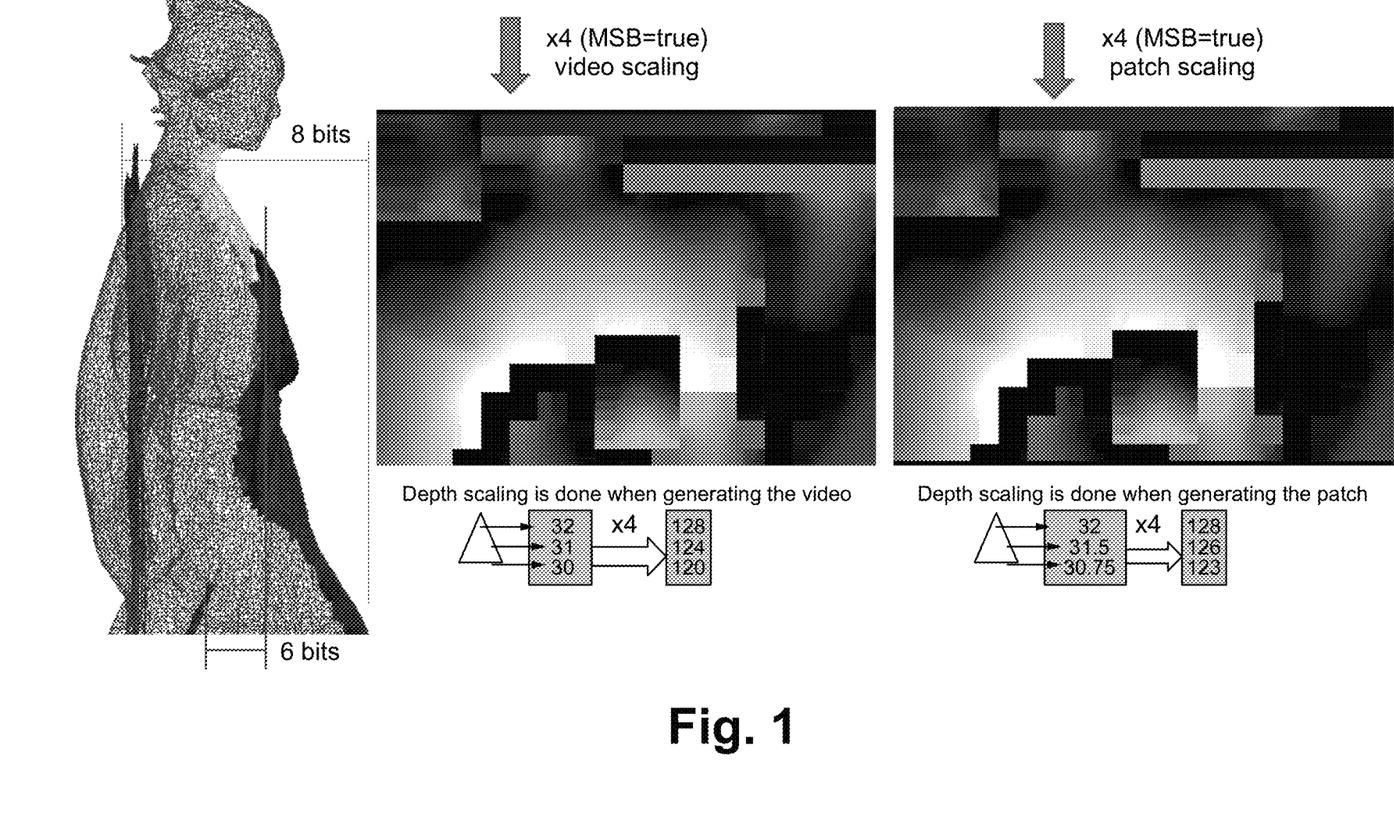
FIG. 1 illustrates a diagram of using MSB alignment to encode depth information according to some embodiments.

FIG. 1 illustrates a diagram of using MSB alignment to encode depth information according to some embodiments. Triangles are projected. Once the triangles are projected, depth images (the distance between the triangle and the projection surface) generate images (e.g., the gray area) shown in image 100. For example, a patch from the image is projected onto a surface from the image. The range (e.g., 8 bits versus 6 bits) determines how much of the image is involved. With 8 bits, values from 0-256 are available, but with 6 bits, the values from 0-64 are available.

An advantage of using N bits (e.g., 8 bits) is that more triangles are able to be together in a patch. When using M bits (e.g., 6 bits), the patches will be segmented since all of the triangles will not be able to fit together. However, when using M bits (e.g., 6 bits) and putting the information in a video which uses N bits (e.g., 8 bits) for the luminous channel, there are N−M bits (e.g., 2 bits) that are unused. The N−M bits (e.g., 2 bits) are able to be used for video scaling (e.g., all of the values are multiplied by 4). For example, 32×4=128, 31×4=124, 30×4=120. The values are the same relatively-speaking, but the last two bits are always zero. By setting the MSB value equal to true (Most Significant Bit alignment), then the video encoder performs the video scaling. On the decoder side, the values are able to be divided by 4 to return to the original values. By performing the video scaling, there is a banding effect from the quantization (e.g., going from 128 to 124 is a large enough difference to generate a banding effect).

Instead of implementing video scaling, patch scaling is able to be performed. When the image is rasterized, the image is able to be rasterized into floating point values. Then, when multiplying by 4, the values are 32×4=128, 31.5×4=126, and 30.75×4=123, so the values are closer to each other such that the transition is smoother, and the banding effect is reduced.

Figure 2:
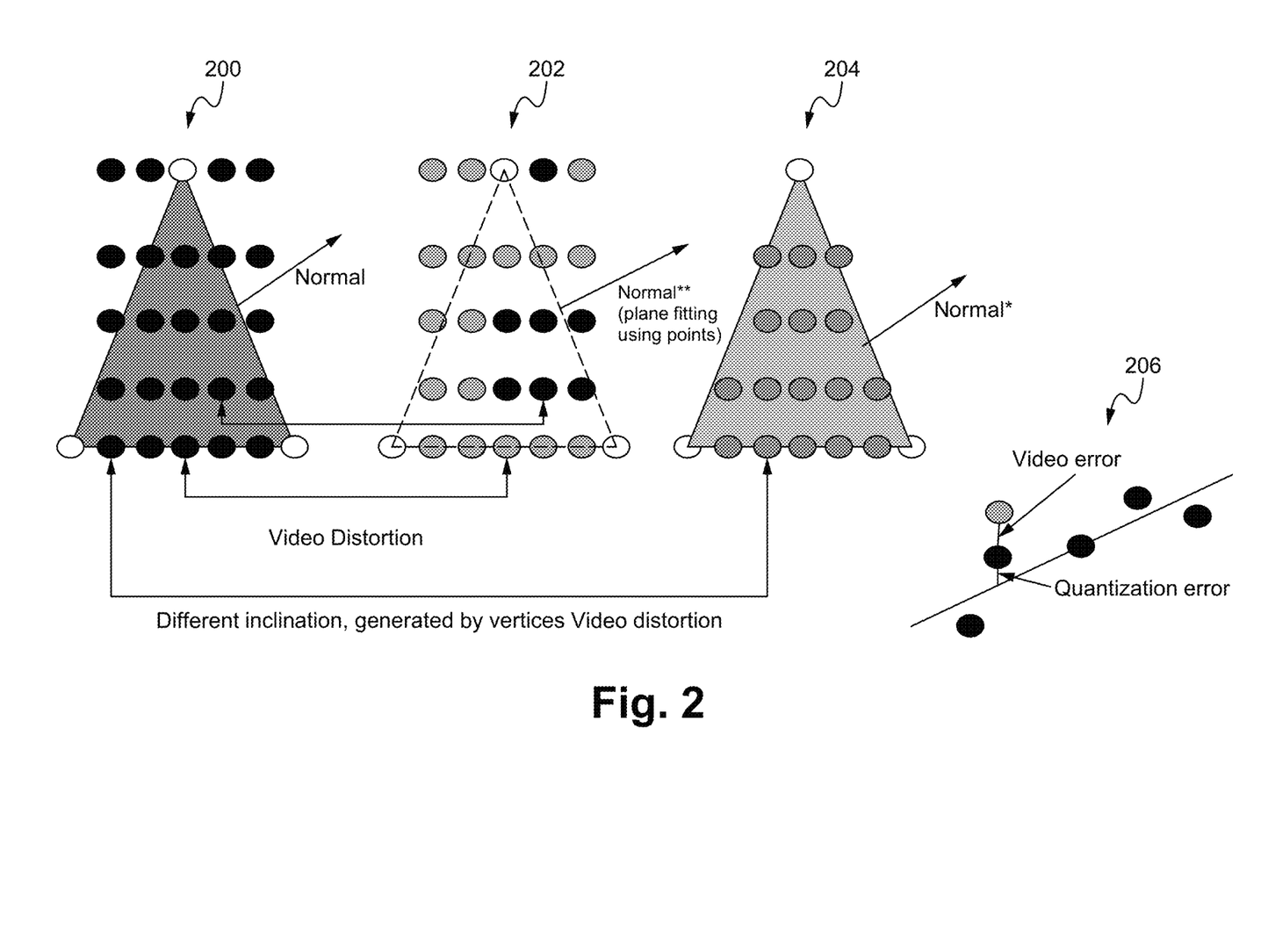
FIG. 2 illustrates a diagram of normal filtering according to some embodiments.

FIG. 2 illustrates a diagram of normal filtering according to some embodiments. When a depth image is decoded, the points (e.g., in diagram 200) are sampled. However, there may be some distortion after video compression (e.g., the color is slightly different as shown in diagram 202). Since the points are sampling a surface of a triangle, so the points should be more or less around the surface as is shown in diagram 206. The patch scaling which multiplies a floating point number could result in a small quantization error such that the point is slightly above or below the surface. Additionally, there is video error (e.g., 128 becomes 129). These errors are indicated in diagram 202 where some values are above or below the appropriate value.

For diagram 200, the normal is determined by taking the cross-product of the vectors of the triangle (e.g., the vector from the point of the top vertex to the point of the bottom left vertex, and the vector from the point of the top vertex to the point of the bottom right vertex). For diagram 202, the normal is determined in the same manner, but the normal is affected by the distortion of the points since they have moved and changed slightly. Thus, the normal of the triangle in diagram 202 is slightly different (e.g., different direction) from the normal of the triangle in diagram 200.

Another way of calculating the normal is performing plane fitting shown in diagram 204. Instead of using the vertex points of the triangle, all of the points (within the triangle including the vertices) are used to find a plane that goes across the points and minimizes the error between the points and the plane. The normal of the plane is able to be calculated. Since more points are used, the resulting normal is typically closer to the original normal.

If the normal calculated by plane fitting is closer to the original normal, then the coordinates of the vertices are able to be adjusted to be closer to the fitted normal. In some embodiments, the normal calculated by plane fitting is compared to the original normal, and if the normal calculated is within a threshold amount of the original normal, then the normal calculated by plane fitting is used. To fix the vertices' positions, the coordinate position that is normal to the projection plane (normal coordinate tangent and bitangent coordinates are coded lossless) is adjusted. The vertex adjustment via normal filtering is able to be performed simultaneously by considering all triangles connected to the vertex. The multi-dimensional problem becomes an optimization problem that is able to be solved with linear equations.

Figure 3:
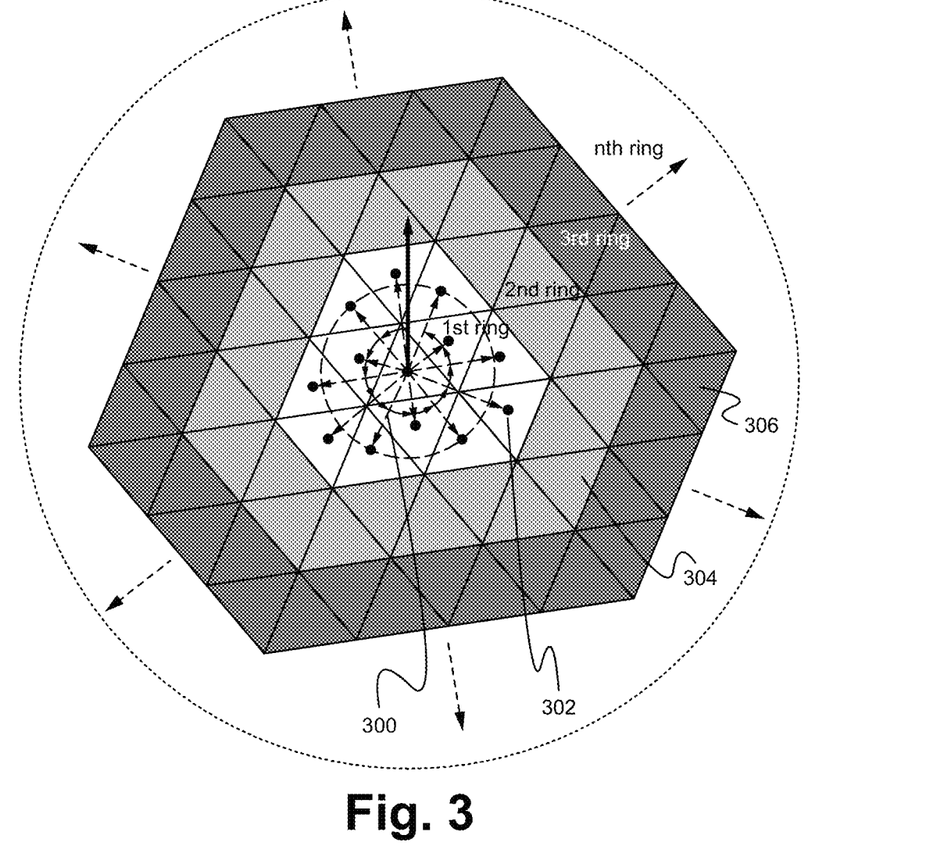
FIG. 3 illustrates a diagram of one-ring, two-ring and three-ring face neighborhoods for minimization of total normal angles according to some embodiments.

FIG. 3 illustrates a diagram of one-ring, two-ring and three-ring face neighborhoods for minimization of total normal angles according to some embodiments. Each set of triangles around a specific triangle is considered a ring. For example, for triangle 300, a first ring 302 of triangles are the twelve triangles surrounding triangle 300. A second ring 304 of triangles are the 24 triangles surrounding the first ring 302. A third ring 306 of triangles are the 36 triangles surrounding the second ring 304. The normals of each ring are able to be used do normal analysis to determine a better, more reliable normal value. The normal value determined using one-ring, two-rings or three-rings is able to be used to adjust the normal value of the triangle (e.g., triangle 300) and/or the position of the vertices of the triangle, so that they generate a normal that fits the improved normal value.

Figure 4:
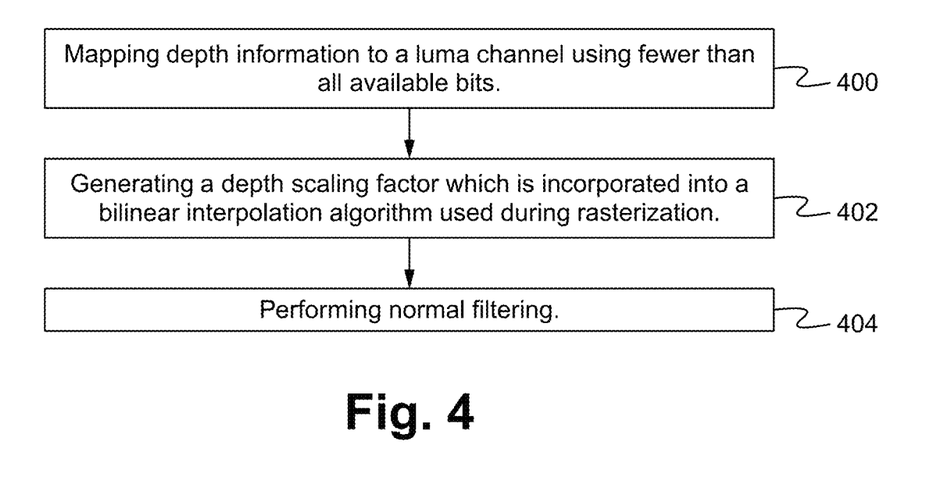
FIG. 4 illustrates a flowchart of a method of mesh geometry coding according to some embodiments.

FIG. 4 illustrates a flowchart of a method of mesh geometry coding according to some embodiments. In the step 400, depth information is mapped to a luma channel using fewer than all available bits. Mapping the depth information to the luma channel includes using M bits of N available bits, where M is less than N, (e.g., 6 of 8, 8 of 10, or 14 of 16). The remaining N–M bits (e.g., 8–6=2) are used for precision improvement (scaling factor). In the step 402, a depth scaling factor is generated which is incorporated into a bilinear interpolation algorithm used during rasterization. Generating the depth scaling factor utilizes the 2 remaining bits of the N available bits (e.g., 8 bits). The 2 remaining bits enable multiplication of data by 4 such that the last two bits of the data are 0, and enabling use of most significant bit alignment. In some embodiments, the depth scaling factor is applied to floating point values. In the step 404, normal filtering is performed including adjusting positions of vertices according to an estimated normal from surface pixels. Normal filtering includes performing plane fitting using points within a triangle. Normal filtering includes using one-ring, two-ring or three-ring face neighborhoods for minimization of total normal angles. In some embodiments, fewer or additional steps are implemented. In some embodiments, the order of the steps is modified.

Figure 5:
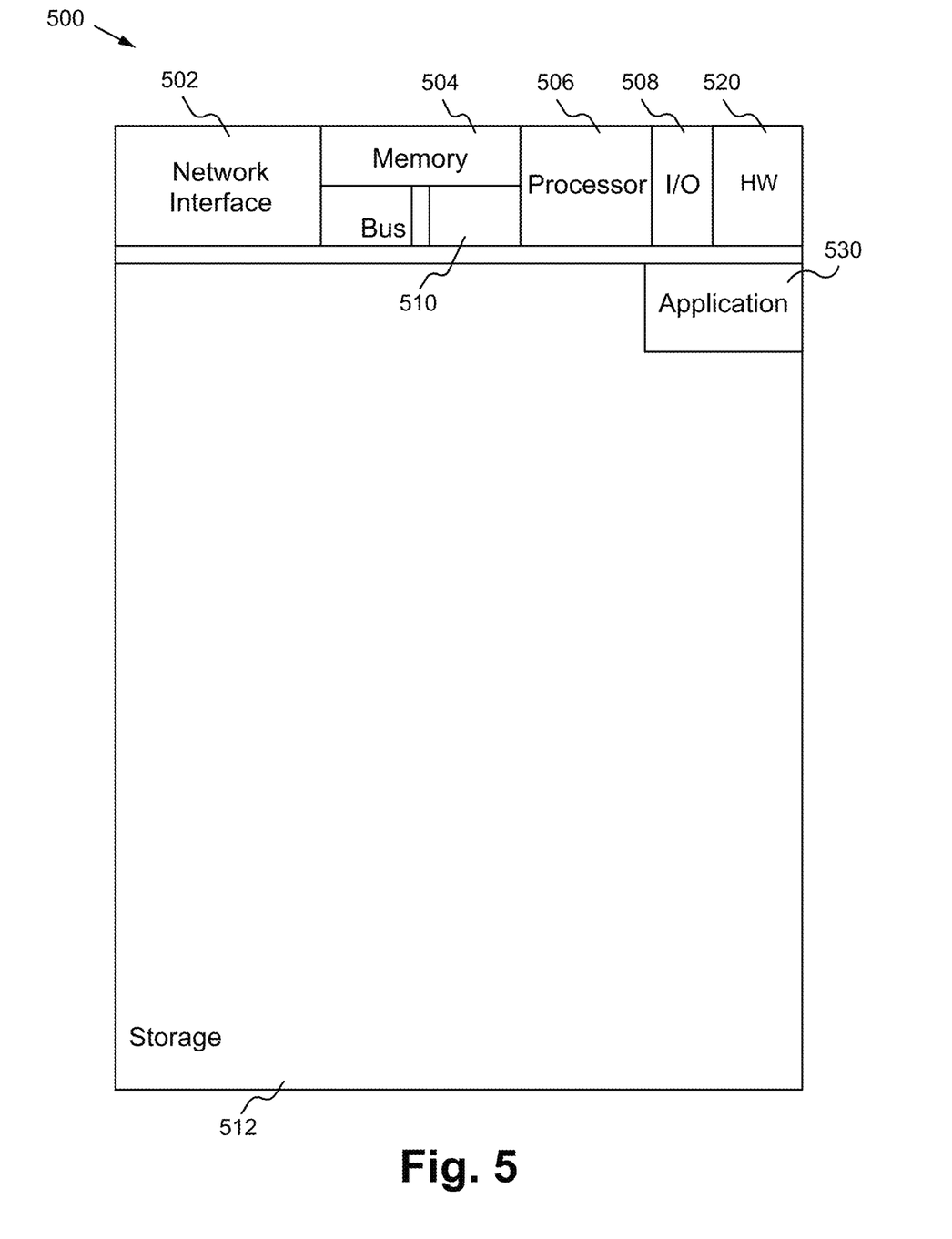
FIG. 5 illustrates a block diagram of an exemplary computing device configured to implement the mesh geometry coding method according to some embodiments.

FIG. 5 illustrates a block diagram of an exemplary computing device configured to implement the mesh geometry coding method according to some embodiments. The computing device 500 is able to be used to acquire, store, compute, process, communicate and/or display information such as images and videos including 3D content. The computing device 500 is able to implement any of the encoding/decoding aspects. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, High Definition disc/drive, ultra-HD drive, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, screen, printer, modem, touchscreen, button interface and other devices. Mesh geometry coding application(s) 530 used to implement the mesh geometry coding implementation are likely to be stored in the storage device 512 and memory 504 and processed as applications are typically processed. More or fewer components shown in FIG. 5 are able to be included in the computing device 500. In some embodiments, mesh geometry coding hardware 520 is included. Although the computing device 500 in FIG. 5 includes applications 530 and hardware 520 for the mesh geometry coding implementation, the mesh geometry coding method is able to be implemented on a computing device in hardware, firmware, software or any combination thereof. For example, in some embodiments, the mesh geometry coding applications 530 are programmed in a memory and executed using a processor. In another example, in some embodiments, the mesh geometry coding hardware 520 is programmed hardware logic including gates specifically designed to implement the mesh geometry coding method.

In some embodiments, the mesh geometry coding application(s) 530 include several applications and/or modules. In some embodiments, modules include one or more sub-modules as well. In some embodiments, fewer or additional modules are able to be included. Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the mesh geometry coding method, a device acquires or receives 3D content (e.g., point cloud content). The mesh geometry coding method is able to be implemented with user assistance or automatically without user involvement.

In operation, the mesh geometry coding method enables more efficient and more accurate 3D content encoding compared to previous implementations. By using a depth scaling factor at the encoder, video images are smoother and easier to encode. At the decoder side, once the video is reconstructed, inconsistencies between the normal values obtained from the surface pixels and the normal value obtained from the surface defined by only three vertices can be verified. Normal filtering can readjust the vertices' positions to align the normal and improve mesh reconstruction. The methods described herein make the images more codec-friendly.

Some Embodiments of Mesh Geometry Coding

1. A method of mesh geometry coding comprising:
   mapping depth information to a luma channel using fewer than all available bits;
   generating a depth scaling factor which is incorporated into a bilinear interpolation algorithm used during rasterization; and
   performing normal filtering including adjusting positions of vertices according to an estimated normal from surface pixels.

2. The method of clause 1 wherein mapping the depth information to the luma channel includes using M bits of N available bits, where M is less than N.
3. The method of clause 2 wherein generating the depth scaling factor utilizes 2 remaining bits of the N available bits.
4. The method of clause 3 wherein the 2 remaining bits enable multiplication of data by 4 such that the last two bits of the data are 0, and enabling use of most significant bit alignment.
5. The method of clause 1 further comprising applying the depth scaling factor to data, wherein the data comprises floating point values.
6. The method of clause 1 wherein normal filtering includes performing plane fitting using points within a triangle.
7. The method of clause 1 wherein normal filtering includes using one-ring, two-ring or three-ring face neighborhoods for minimization of total normal angles.
8. An apparatus comprising:
   a non-transitory memory for storing an application, the application for:
      mapping depth information to a luma channel using fewer than all available bits;
      generating a depth scaling factor which is incorporated into a bilinear interpolation algorithm used during rasterization; and
      performing normal filtering including adjusting positions of vertices according to an estimated normal from surface pixels; and
   a processor coupled to the memory, the processor configured for processing the application.
9. The apparatus of clause 8 wherein mapping the depth information to the luma channel includes using M bits of N available bits, where M is less than N.
10. The apparatus of clause 9 wherein generating the depth scaling factor utilizes 2 remaining bits of the N available bits.
11. The apparatus of clause 10 wherein the 2 remaining bits enable multiplication of data by 4 such that the last two bits of the data are 0, and enabling use of most significant bit alignment.
12. The apparatus of clause 8 wherein the application is configured for applying the depth scaling factor to data, wherein the data comprises floating point values.
13. The apparatus of clause 8 wherein normal filtering includes performing plane fitting using points within a triangle.
14. The apparatus of clause 8 wherein normal filtering includes using one-ring, two-ring or three-ring face neighborhoods for minimization of total normal angles.
15. A system comprising:
   one or more cameras for acquiring three dimensional content;
   an encoder for encoding the three dimensional content:
      mapping depth information to a luma channel using fewer than all available bits;
      generating a depth scaling factor which is incorporated into a bilinear interpolation algorithm used during rasterization; and
      performing normal filtering including adjusting positions of vertices according to an estimated normal from surface pixels.
16. The system of clause 15 wherein mapping the depth information to the luma channel includes using M bits of N available bits, where M is less than N.
17. The system of clause 16 wherein generating the depth scaling factor utilizes 2 remaining bits of the N available bits.
18. The system of clause 17 wherein the 2 remaining bits enable multiplication of data by 4 such that the last two bits of the data are 0, and enabling use of most significant bit alignment.
19. The system of clause 15 wherein the encoder is configured for applying the depth scaling factor to data, wherein the data comprises floating point values.
20. The system of clause 15 wherein normal filtering includes performing plane fitting using points within a triangle.
21. The system of clause 15 wherein normal filtering includes using one-ring, two-ring or three-ring face neighborhoods for minimization of total normal angles.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method of mesh geometry coding comprising:
   mapping depth information to a luma channel using fewer than all available bits, wherein mapping the depth information to the luma channel includes using M bits of N available bits, where M is less than N;
   generating a depth scaling factor which is incorporated into a bilinear interpolation algorithm used during rasterization, wherein generating the depth scaling factor utilizes two remaining bits of the N available bits; and
   performing normal filtering including adjusting positions of vertices according to an estimated normal from surface pixels.
2. The method of claim 1 wherein the two remaining bits enable multiplication of data by 4 such that the last two bits of the data are 0, and enabling use of most significant bit alignment.
3. The method of claim 1 further comprising applying the depth scaling factor to data, wherein the data comprises floating point values.
4. The method of claim 1 wherein normal filtering includes performing plane fitting using points within a triangle.
5. The method of claim 1 wherein normal filtering includes using one-ring, two-ring or three-ring face neighborhoods for minimization of total normal angles.
6. An apparatus comprising:
   a non-transitory memory for storing an application, the application for:
      mapping depth information to a luma channel using fewer than all available bits, wherein mapping the depth information to the luma channel includes using M bits of N available bits, where M is less than N;
      generating a depth scaling factor which is incorporated into a bilinear interpolation algorithm used during rasterization, wherein generating the depth scaling factor utilizes two remaining bits of the N available bits; and performing normal filtering including adjusting positions of vertices according to an estimated normal from surface pixels; and a processor coupled to the memory, the processor configured for processing the application.

7. The apparatus of claim 6 wherein the two remaining bits enable multiplication of data by 4 such that the last two bits of the data are 0, and enabling use of most significant bit alignment.

8. The apparatus of claim 6 wherein the application is configured for applying the depth scaling factor to data, wherein the data comprises floating point values.

9. The apparatus of claim 6 wherein normal filtering includes performing plane fitting using points within a triangle.

10. The apparatus of claim 6 wherein normal filtering includes using one-ring, two-ring or three-ring face neighborhoods for minimization of total normal angles.

11. A system comprising:
one or more cameras for acquiring three dimensional content;
an encoder for encoding the three dimensional content:
mapping depth information to a luma channel using fewer than all available bits, wherein mapping the depth information to the luma channel includes using M bits of N available bits, where M is less than N;
generating a depth scaling factor which is incorporated into a bilinear interpolation algorithm used during rasterization, wherein generating the depth scaling factor utilizes two remaining bits of the N available bits; and
performing normal filtering including adjusting positions of vertices according to an estimated normal from surface pixels.

12. The system of claim 11 wherein the two remaining bits enable multiplication of data by 4 such that the last two bits of the data are 0, and enabling use of most significant bit alignment.

13. The system of claim 11 wherein the encoder is configured for applying the depth scaling factor to data, wherein the data comprises floating point values.

14. The system of claim 11 wherein normal filtering includes performing plane fitting using points within a triangle.

15. The system of claim 11 wherein normal filtering includes using one-ring, two-ring or three-ring face neighborhoods for minimization of total normal angles.

* * * * *